Feb. 8, 1944.  M. O'FARRELL  2,341,472
CUSHIONING DEVICE FOR ROCK DRILLS
Filed Jan. 21, 1942   2 Sheets-Sheet 2

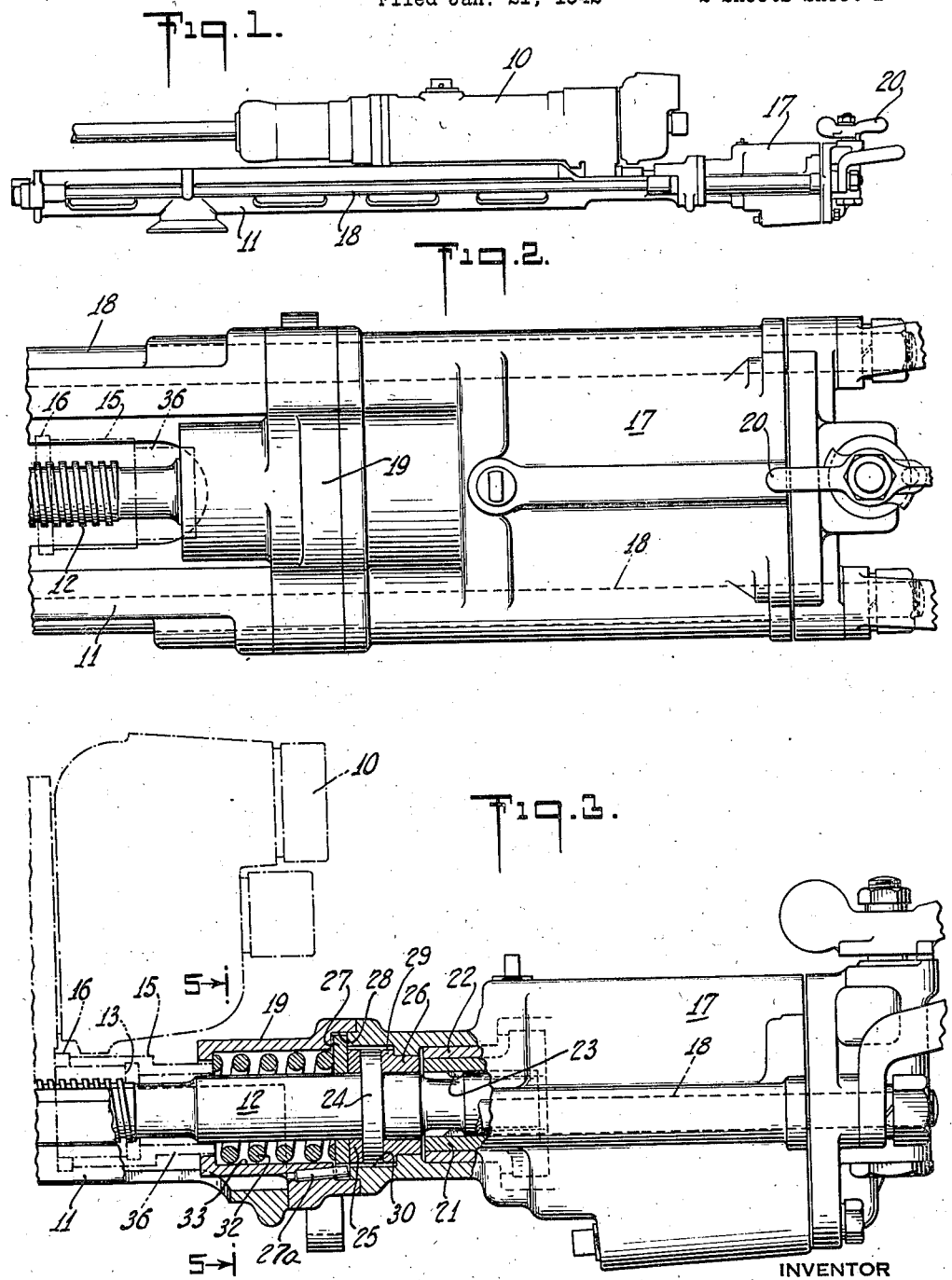

INVENTOR
MATTHEW O'FARRELL.
BY
Raymond G. Mullee
ATTORNEY

Patented Feb. 8, 1944

2,341,472

UNITED STATES PATENT OFFICE 2,341,472

CUSHIONING DEVICE FOR ROCK DRILLS

Matthew O'Farrell, Detroit, Mich., assignor to Chicago Pneumatic Tool Company, New York, N. Y., a corporation of New Jersey Application January 21, 1942, Serial No. 427,582

1 Claim. (Cl. 255—51)

This invention relates to rock drilling mechanism and more particularly to a cushioning device for a rock drill of the type that is fed toward and from the work by a motor driven feed screw.

In the operation of drilling apparatus of this type it frequently happens, through inadvertence, that the motor feed is permitted to continue turning the feed screw at the end of the backward stroke of the drill with the result that the motor stalls only after the drill has struck a stationary part of the support. The reaction of the impact may produce a tight locking engagement between the feed screw and feed nut and prevent the motor from starting on its next forward stroke.

The general object of the invention is to cushion the impact of the drill at the end of its rearward stroke thereby permitting the motor to stall before the axial thrust against the feed nut becomes excessive.

More specific objects are the provision of a buffer spring constructed and arranged to present a gradually increasing resistance to axial movement of the drill and, hence, to rotation of the feed screw; to enclose such a spring for the purposes of protecting the operator against injury and excluding muck from the spring; and to support the spring out of contact with the feed screw.

In the accompanying drawings which illustrate one embodiment of the invention:

Fig. 1 is a side elevation of a drilling mechanism equipped with the cushioning arrangement of the present invention;

Fig. 2 is a plan view of a fragmentary portion of the drilling mechanism shown in Fig. 1, the rock drill and parts carried thereby being omitted with the exception of the feed nut retainer and associated washer which are illustrated in broken lines;

Fig. 3 is a side view, partly in elevation and partly in section, of the apparatus shown in Fig. 2, a part of the rock drill being illustrated in broken lines in the position assumed by the drill when it first makes contact with the buffer spring;

Figure 4:
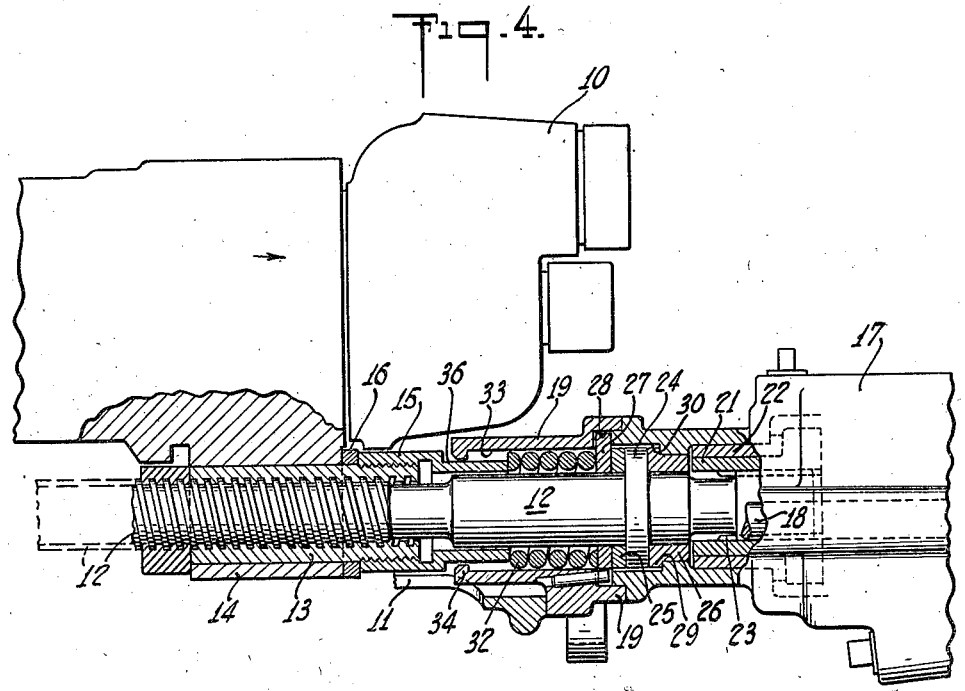
Fig. 4 is a view similar to Fig. 3 but with the drill shown in full lines and in the position of maximum compression of the buffer spring.
Figure 5:
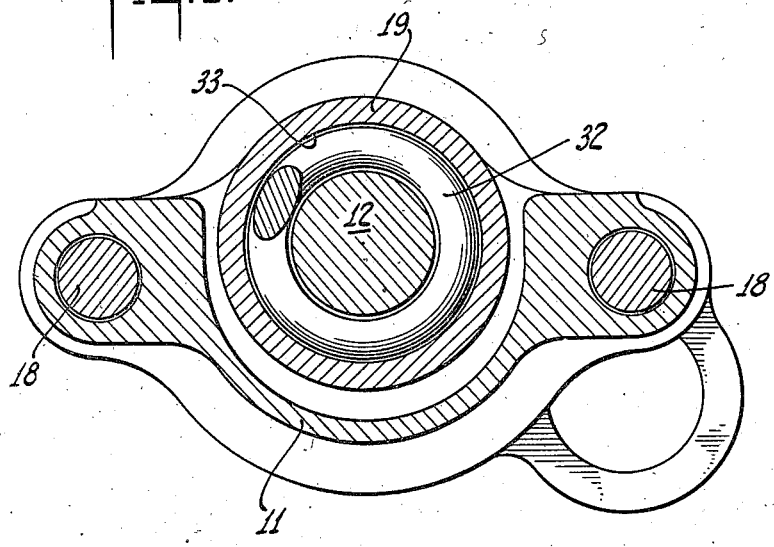
Fig. 5 is a cross section, as indicated by the arrows 5 in Fig. 3.

In the illustrative embodiment of the invention, the drilling mechanism comprises a rock drill 10 slidably supported by a guide shell 11. Longitudinal movement of the drill on the shell is effected by a feed screw 12 having threaded engagement with a feed nut 13 fixed to a projection 14 depending from the drill. As seen in Fig. 4, the feed nut 13 is held in place by a retaining nut 15 having screw-threaded engagement around the feed nut 13 and abutting against a washer 16 on the drill.

The feed screw 12 is driven by a rotary vane type air motor, not shown, enclosed within a motor feed housing 17. The housing is supported by side rods 18 which pass through apertured projections on the guide shell 11 and on a buffer spring case 19 which is clamped between the rear end of the guide shell and the front end of the motor housing 17. The rotary motor is controlled by the usual throttle handle 20 and imparts rotation through a suitable gear reduction, not shown, to a driving head 21 supported in a bushing 22. Head 21 has internal splines 23 cooperating with external splines on the feed screw 12 adjacent its rear extremity.

Feed screw 12 is provided with a collar 24 confined between a thrust washer 25 and a thrust bushing 26. The bushing 26 may be mounted either rigidly or loosely in motor feed housing 17, while the washer 25 is free to float. Preferably, the washer and bushing are made of a softer metal than that of the feed screw collar 24. The front face of the thrust washer is engageable with a washer 27 which is disposed in a recess 28 in buffer spring case 19. Washer 27 abuts against the front extremity of motor housing 17 and is held against rotation by a pin 27a. Bushing 26 has a flange 29 seated in a counterbore 30 in motor housing 17. The arrangement of the bushing 26 and washers 25 and 27 permits free rotary movement of the feed screw 12 but prevents its axial movement in either a forward or a rearward direction.

Within buffer spring case 19 is a spring 32 which encircles a cylindrical portion of the feed screw 12. Preferably, the spring is of such dimensions that it has a slight clearance between its outer periphery and the bore 33 of the casing 19, and a somewhat greater clearance around the feed screw 12. The spring is maintained in preloaded condition or under initial compression between washer 27 and an internal flange 34 at the front extremity of buffer spring case 19. Spring 32 acts as a buffer for the retaining nut 15 which is carried by the drill. For this purpose, the nut is provided with a cylindrical extension 36 adapted to project within the flange 34 on the spring case 19. The extension may abut against the front end of the spring and compress it during rearward movement of the drill from the Fig. 3 to the Fig. 4 position.

The operation of the illustrative embodiment of the invention is as follows. Assume that the drill is in an advanced position and the operator desires to retract it. The throttle handle 20 is turned to the reverse position and the motor feed starts to operate with the driving head 21 imparting rotation to the feed screw 12 through the splines 23. Rotation of the feed screw relative to the feed nut 13 causes the drill 10 to slide in the guide shell 11 in a well known manner. Ordinarily the operator will stop the feed motor at or prior to the time that the drill reaches the position shown in Figs. 1 and 3. If, however, rotation of the feed screw 12 is permitted to continue, the extension 36 on the feed nut retainer comes into contact with the buffer spring 32 as shown in Fig. 3. Further rotation of the feed screw 12 is resisted by the pressure of spring 32 which is transmitted through the feed nut retainer 15 and feed nut 13, thereby causing a part of the motor torque to be expended in compressing the spring as well as in overcoming the friction between the screw threads. The pressure of the spring against the extension 36 increases gradually as the feed screw 12 continues rotating and the extent of compression of the spring increases. By way of illustration, the spring may be placed under an initial compression of 150 pounds and increase its resistance by a like amount for each one-eighth inch of compression of the spring, while the projection 36 moves in contact with the spring for a maximum distance of about three-quarters of an inch. At some point in the movement of the projection against the spring pressure, the torque required to continue driving the feed screw 12 will rise to such an extent as to stall the motor and prevent further rotation of the feed screw 12.

When the operator desires to advance the drill 10, he turns the throttle handle 20 to the forward position, thereby reversing the air connections to the rotary motor. The torque required to turn the feed screw 12 in the forward feeding direction is less than the torque at which the motor stalled previously, and the motor starts in the usual manner, driving the feed screw 12, causing the drill 10 to carry the projection 36 out of range of the buffer spring 32 and permitting the spring to expand to the position shown in Fig. 3.

The arrangement of the buffer spring 32 within the spring case 19 is such that the spring is out of contact with the feed screw 12, does not rotate with the screw, and does not exert axial pressure against the screw. The enclosure for the spring has the additional advantages of safety for the operator and the exclusion of muck from the spring and associated working parts.

What is claimed is:

A rock drilling mechanism comprising a guide shell, a rock drill mounted for reciprocation therein, a feed nut carried by the drill, a feed nut retainer fastened around the rear extremity of the feed nut for rigidly securing the feed nut to the drill, a feed screw having threaded engagement with the feed nut for imparting reciprocatory movement to the drill, a thrust collar on the feed screw, thrust sustaining means on opposite sides of the thrust collar and carried by the guide shell for inhibiting axial movement of the feed screw, a buffer spring surrounding the feed screw but not rotatable therewith, a spring case surrounding the buffer spring and having an internal projection at its front end to engage the front end of the spring to maintain the spring under initial compression, said feed nut retainer having an extension adapted to bypass said internal projection upon said spring case and abut against the front end of the spring and remove said front end of the latter from contact with said internal projection and compress the spring upon movement of the drill at the end of its rearward stroke.

MATTHEW O'FARRELL.